United States Patent
Luo et al.

(10) Patent No.: US 8,305,899 B2
(45) Date of Patent: Nov. 6, 2012

(54) PULL-BASED DATA TRANSMISSION APPROACH

(75) Inventors: Chong Luo, Beijing (CN); Wei Pu, Hefei (CN); Changwen Chen, East Amherst, NY (US); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1179 days.

(21) Appl. No.: 12/127,838

(22) Filed: May 28, 2008

(65) Prior Publication Data

US 2009/0296670 A1   Dec. 3, 2009

(51) Int. Cl.
*H04J 3/14* (2006.01)
*H04J 3/08* (2006.01)
*H04B 7/204* (2006.01)
*H04L 12/56* (2006.01)
*H04L 12/54* (2006.01)

(52) U.S. Cl. ........ 370/236; 370/325; 370/326; 370/412; 370/428; 370/429

(58) Field of Classification Search .................. None
See application file for complete search history.

(56) References Cited

U.S. PATENT DOCUMENTS

| | | | |
|---|---|---|---|
| 5,276,677 A | | 1/1994 | Ramamurthy et al. |
| 5,319,638 A | * | 6/1994 | Lin .............................. 370/235 |
| 5,905,871 A | * | 5/1999 | Buskens et al. ............. 709/245 |
| 6,445,679 B1 | * | 9/2002 | Taniguchi et al. ........... 370/232 |
| 6,690,645 B1 | * | 2/2004 | Aweya et al. ................ 370/230 |
| 6,715,007 B1 | * | 3/2004 | Williams et al. ............... 710/52 |
| 6,757,273 B1 | * | 6/2004 | Hsu et al. ..................... 370/349 |
| 6,950,436 B2 | | 9/2005 | Kitai et al. |
| 7,274,661 B2 | * | 9/2007 | Harrell et al. ................. 370/229 |
| 7,342,880 B2 | * | 3/2008 | Yanagihara et al. .......... 370/232 |
| 7,573,820 B2 | * | 8/2009 | Krishnaswamy et al. .... 370/235 |
| 7,590,064 B1 | * | 9/2009 | Zhang et al. .................. 370/235 |
| 7,844,727 B2 | * | 11/2010 | Leon et al. .................... 709/233 |
| 2003/0053415 A1 | | 3/2003 | Balakrishnan et al. |
| 2004/0047290 A1 | * | 3/2004 | Komandur et al. ........... 370/230 |
| 2005/0063308 A1 | * | 3/2005 | Wise et al. .................... 370/236 |
| 2005/0254472 A1 | | 11/2005 | Roh et al. |
| 2006/0109787 A1 | | 5/2006 | Strutt et al. |
| 2007/0076754 A1 | | 4/2007 | Krishnaswamy |
| 2007/0147322 A1 | | 6/2007 | Agrawal et al. |

FOREIGN PATENT DOCUMENTS

WO    2008003249 A1   1/2008

OTHER PUBLICATIONS

Zhao, et al., "Understanding Packet Delivery Performance in Dense Wireless Sensor Networks", SenSys'03, Nov. 5-7, 2003, pp. 1-13.

(Continued)

*Primary Examiner* — Ian N Moore
*Assistant Examiner* — Brian T Le

(57) ABSTRACT

A network can include a number of nodes that link a source node to a sink node. When a first node in a network sends a packet to its downstream node, this information is also received at its upstream node. In response to learning that the first node has sent a packet, the upstream node sends another packet to the first node. In essence, a pull-based transmission approach is used to mitigate congestion and address the funneling effect in data transmission networks such as wireless video sensor networks.

15 Claims, 4 Drawing Sheets

OTHER PUBLICATIONS

Kumar, et al., "Congestion Aware Routing in Sensor Networks", Apr. 2006, pp. 1-15.

Yi, et al., "Hop-by-hop Congestion Control over a Wireless Multi-hop Network", Feb. 2007, pp. 1-12.

Stann, et al., "RMST: Reliable Data Transport in Sensor Networks", Appearing in 1st IEEE International Workshop on Sensor Net Protocols and Applications (SNPA), Anchorage, Alaska, USA. May 11, 2003, pp. 1-11.

"MICAz wireless measurement system", http://www.xbow.com/Products/Product_pdf_files/Wireless_pdf/6020-0060-01_A_MICAz.pdf.

R. Jain, "Myths about congestion management in high speed networks", 1992, pp. 1-24.

Wan, et al., "PSFQ: a reliable transport protocol for wireless sensor networks", Sep. 18, 2002, pp. 1-20.

Sankarasubramaniam, et al., "Event-to-sink reliable transport in wireless sensor networks", MobiHoc'03, Jun. 1-3, 2003, pp. 177-188.

Wan, et al., "CODA: Congestion Detection and Avoidance in Sensor Networks", SenSys'03, Nov. 5-7, 2003, pp. 266-279.

Hull, et al., "Mitigating congestion in wireless sensor networks", SenSys'04, Nov. 3-5, 2004, pp. 134-147.

Rahimi, et al., "Cyclops: image sensing and interpretation in wireless networks", SenSys'04, Nov. 3-5, 2004, p. 311.

Feng, et al., "Panoptes: scalable low-power video sensor networking technologies", 2005, pp. 1-25.

Zhang, et al., "Reliable bursty convergecast in wireless sensor networks", 2005, pp. 1-12.

Galluccio, et al., "CONCERT: aggregation-based CONgestion Control for SEnsoR neTworks", SenSys'05, Nov. 2-4, 2005, pp. 274-275.

Kulkarni, et al., "SensEye: a multi-tier camera sensor network", MM'05, Nov. 6-11, 2005, pp. 229-238.

Rangwala, et al., "Interference-aware fair rate control in wireless sensor networks", 2005, pp. 1-14.

Ahn, et al., "Funneling-MAC: a localized, sink-oriented MAC for boosting fidelity in sensor networks", SenSys'06, Nov. 1-3, 2006, pp. 293-306.

Liu et al., "Information-intensive wireless sensor networks: potential and challenges", IEEE Communications Magazine, Nov. 2006, pp. 142-147.

Paek, et al., "RCRT: rate-controlled reliable transport for wireless sensor networks", SenSys'07, Nov. 6-9, 2007, pp. 305-319.

Chen, et al., "An energy efficient coordination algorithm for topology maintenance in ad hoc wireless networks", 2001, pp. 85-96.

Kulik, et al., "Adaptive protocols for information dissemination in wireless sensor networks", 1999, pp. 1-15.

Hill, et al., "A wireless platform for deeply embedded networks", IEEE, 2002, pp. 12-24.

Hill, et al., "System architecture directions for network sensors", Nov. 2000, pp. 1-12.

Intanagonwiwat, et al., "Directed diffusion: A scalable and robust communication paradigm for sensor networks", 2000, pp. 56-67.

Li, et al., "Capacity of ad hoc wireless networks", 2001, pp. 1-9.

Pottie, et al., "Wireless integrated network sensors", vol. 43, No. 5, May 2000, pp. 51-58.

Sinha, et al., "Wtcp: A reliable transport protocol for wireless wide-area networks", 2004- pp. 1-12.

Tilak, et al., "Infrastructure tradeoffs for sensor networks", 2002, pp. 1-10.

Woo, et al., "A transmission control scheme or media access in sensor networks", 2001, pp. 221-235.

Xu, et al., "Geography-informed energy conservation for ad hoc routing", Jul. 16-21, 2001, pp. 70-84.

Ye, et al., "An energy efficient mac protocol for wireless sensor networks", 2002, vol. 3, pp. 1567-1576.

Ahn, et al., "Supporting service differentiation for real-time and best effort traffic in stateless wireless ad hoc networks (swan)", 2002, pp. 1-10.

"The Network Simulator—ns-2", http://www.isi.edu/nsnam/ns/.

"Tinyos homepage.", http://webs.cs.berkeley.edu/tos.

Aad, et al., "Differentiation Mechanisms for IEEE 802.11", IEEE, 2001, pp. 209-218.

Chipcon, "CC1000 Transceiver Datasheet", User Manual, Rev. 2.11, pp. 1-24.

Couto, et al., "A High-Throughput Path Metric for Multi-Hop Wireless Routing", MobiCom '03, Sep. 14-19, 2003, pp. 134-146.

Ganeriwal, et al., "Timing-sync Protocol for Sensor Networks", SenSys '03, Nov. 5-7, 2003, pp. 138-149.

Lee, et al., "Flow-Rate Based Hop by Hop Backpressure Control for IEEE 802.3x", IEEE, 2002, pp. 202-207.

Lemmon, et al., "Overload Management in Sensor-Actuator Networks used for Spatially-Distributed Control Systems", Apr. 9, 2003, pp. 1-15.

Lu, et al., "A Real-Time Communication Architecture for Large-Scale Wireless Sensor Networks", 2002, pp. 55-66.

Luo, et al., "A New Model for Packet Scheduling in Multihop Wireless Networks", 2000, pp. 76-86.

Mainwaring, et al., "Wireless Sensor Networks for Habitat Monitoring", WSNA'02, Sep. 28, 2002, pp. 88-97.

Mishra, et al., "A Hop by Hop Rate-based Congestion Control Scheme", 1992, pp. 112-123.

Nandagopal, et al., "Achieving MAC Layer Fairness in Wireless Packet Networks", 2000, pp. 87-98.

Noureddine, et al., "Selective Backpressure in Switched Ethernet LANs", 1999, pp. 1-9.

Ozveren, et al., "Reliable and Efficient Hop-by-Hop Flow Control", vol. 13, No. 4, IEEE, May 1995, pp. 642-650.

Perkins, et al., "Highly Dynamic Destination-Sequenced Distance-Vector Routing (DSDV) for Mobile Computers", 1994, pp. 234-244.

Dam, et al., "An Adaptive Energy-Efficient MAC Protocol for Wireless Sensor Networks", Nov. 5-7, 2003, pp. 71-80.

"Motelab webpage", http://motelab.eecs.harvard.edu.

Woo, et al., "Taming the Underlying Challenges of Reliable Multihop Routing in Sensor Networks", SenSys'03, Nov. 5-7, 2003, pp. 14-27.

\* cited by examiner

500

510
QUEUE PACKETS IN A BUFFER AT A SOURCE NODE

520
TRANSMIT PACKETS FROM THE SOURCE NODE TO A DOWNSTREAM NODE AT A $1^{ST}$ RATE

530
INCREASE THE TRANSMISSION RATE WHEN THE NUMBER OF PACKETS IN THE BUFFER IS LESS THAN A $1^{ST}$ THRESHOLD

540
DECREASE THE TRANSMISSION RATE WHEN THE NUMBER OF PACKETS IN THE BUFFER IS GREATER THAN A $2^{ND}$ THRESHOLD

PULL-BASED DATA TRANSMISSION APPROACH

BACKGROUND

Generally speaking, a wireless sensor network includes source nodes that are connected to a sink node via a number of parallel routing paths, each path including a number of intermediate nodes. In other words, a wireless sensor network can be characterized as a many-to-one, multi-hop wireless network. The many-to-one aspect of such a network creates a funneling effect that can cause congestion even under light to moderate traffic loads, especially at the sink node.

Data transmission in a wireless video sensor network presents unique challenges beyond those found in other types of wireless sensor networks. First, video streams employ higher bit rates and therefore require greater bandwidths, which aggravate the funneling effect. Second, conventional techniques that utilize data aggregation to mitigate the funneling effect may be impractical in wireless video sensor networks. Aggregation of video data requires sophisticated processing that is generally beyond the capability of the nodes in wireless sensor networks. Even if such processing was practical, a data transmission scheme that proactively mitigates congestion in wireless sensor networks would be valuable.

SUMMARY

In general, when a first node of, for example, a wireless sensor network sends a packet to its downstream node, this information is also received at its upstream node. In response to learning that the first node has sent a packet, the upstream node sends another packet to the first node. In essence, a pull-based transmission approach is used to mitigate congestion and address the funneling effect in data transmission networks such as wireless video sensor networks.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
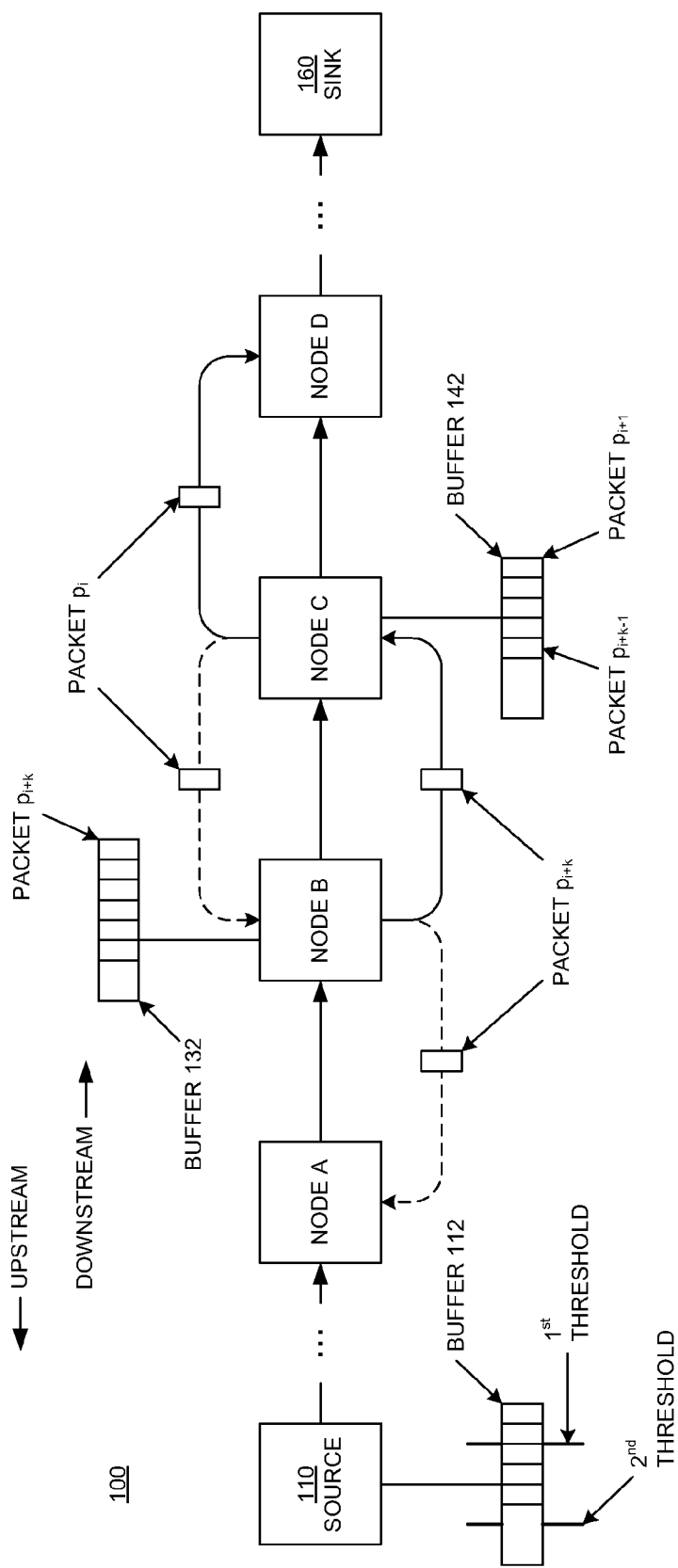
FIGS. 1 and 2 are block diagrams of embodiments of a data transmission network.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "receiving," "sending," "broadcasting," "identifying," "adjusting," "queuing," "comparing," "detecting," "transmitting," "increasing," "decreasing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

According to embodiments described herein, a pull-based data transmission approach is used to mitigate congestion and address the funneling effect otherwise experienced in data transmission networks such as wireless sensor networks, particularly wireless video sensor networks. In overview, a push-based approach is initially utilized to send packets (e.g., video data packets) from a source node to a sink node along a routing path that includes some number of intermediate nodes. During the push-based period, the source node sends packets in a best-effort manner until packets start to accumulate in buffers at each of the intermediate nodes. When the buffer at an intermediate node is filled to a "target queue length," then its neighboring upstream node transitions to the pull-based approach. In a similar manner, other intermediate nodes eventually transition to the pull-based approach until the pull-based approach is propagated along the length of the routing path. This process as well as the pull-based approach itself are described in greater detail below.

The pull-based approaches described herein can be implemented as a cross-layer approach that spans the MAC (Media Access Control), transport, network and application layers of the OSI (Open Systems Interconnection) reference model. As will be elaborated on below, a pull-based approach utilizes node-by-node (hop-by-hop) eavesdropping at the MAC layer—that is, an upstream node is able to eavesdrop on its neighboring downstream node and learn when that downstream node has sent a packet to the next downstream node—and implements hop-by-hop congestion control at the transport layer. Strictly speaking, hop-by-hop control lies between the network and transport layers. However, because each node on the routing path is made aware of packet flow and uses that information for flow control, the pull-based approaches described herein are placed at the transport layer because that layer is generally responsible for flow control. At the MAC layer and the network layer, the 802.11 MAC protocol and DSDV (Destination-Sequenced Distance-Vector) routing protocol, respectively, can be used.

The pull-based approaches described herein include mechanisms to address packet loss between nodes. These approaches also include mechanisms to address fair rate allocation across concurrent and competing data streams (e.g., across routing paths that converge on the same sink node). More specifically, at the application layer, a fair rate allocation mechanism can be implemented at sink nodes, and a rate adaptation mechanism can be implemented at source nodes.

FIG. 1 is a block diagram of an embodiment of a data transmission network 100. In the example of FIG. 1, the network 100 includes a source node 110 and a sink node 160. The routing path between the source 110 and the sink 160 includes a number of intermediate nodes, represented as nodes A, B, C and D. In one embodiment, wireless communication is used along the routing path from the source 110 to the sink 160. The network 100 may be used, for example, in military, environmental monitoring or surveillance applications.

There may be any number of intermediate nodes in the routing path. There may also be more than one source node linked by a routing path to the sink 160—the different routing paths may be parallel to one another, or they may share one or more intermediate nodes (that is, an intermediate node may be a member of more than one routing path). Furthermore, the routing path between the source 110 and the sink 160 may change over time. For example, if for some reason there is persistent breakage along the routing path (e.g., an intermediate node malfunctions, or interference prevents adjacent nodes from communicating), then the underlying routing protocol will perform a re-routing to build up a new routing path between the source 110 and the sink 160. Regardless, at any point in time, the routing path between the source 110 and the sink 160 can be generally represented using the example of FIG. 1.

In one embodiment, the source 110 is a data capture node and includes one or more sensors, a transceiver, a power source, a memory (e.g., a packet buffer 112), and a microprocessor. The sensors may be, for example, temperature sensors, humidity sensors, audio sensors, and/or video sensors. Depending on the complexity of the captured data, the source 110 may include encoding (data compression) functionality.

The sink 160 can include similar elements but, in general, may not include a sensor and may provide decoding functionality instead of encoding functionality. The intermediate nodes A-D can also include similar elements but may only provide limited (if any) data processing capability and may not include a sensor.

In particular, each of the nodes A-D includes a packet buffer, although only the buffers 132 and 142 (located on nodes B and C, respectively) are shown in the example of FIG. 1. The lengths of the buffers may be the same or different for each node. Each buffer is essentially a FIFO (a first-in, first-out buffer).

In one embodiment, the network 100 is a multi-tier wireless sensor network in which low-power motes (not shown) are used to trigger the higher-powered sensors of the source 110. In such a network, the sensors are triggered to record and transmit data to the sink 160 when a certain type of event is detected by the motes. Thus, data delivery in such a network can be characterized as event-driven. An event-driven data delivery model can be more difficult to coordinate than continuous and sink-initiated data delivery models because, when there is a burst of events, the network is prone to congestion.

Hop-by-Hop Transport Control

Operation according to a pull-based approach is described below in conjunction with FIG. 1. Initiation of a data stream and transition to a pull-based approach are described in conjunction with FIG. 2, further below.

Each node A-D in the network 100 communicates its buffer length to its neighboring nodes, in particular its upstream node. In the example of FIG. 1, the length of the buffer 142 of node C is 'k' packets, and this information is known to node B. Similarly, the length of the buffer 132 of node B is known to node A.

At an instance of time 't,' node C sends a packet $p_i$ to its next hop, node D. In particular, because of the broadcast nature of wireless communication, the packet $p_i$ is received by both node B and node D. The packet $p_i$ contains information that identifies its destination as node D; node B reads this information, recognizes that it is not the destination of the packet $p_i$, and so discards the packet. Nevertheless, node B is, in essence, notified that node C has sent the packet $p_i$ to its next hop, node D. In response to learning that node C has transmitted packet $p_i$, node B sends another packet to node C. Specifically, based on the knowledge that the buffer 142 of node C has a target queue length of 'k' packets, node B sends the packet $P_{i+k}$ to node C in the next time slot.

In order to deal with packet losses that may occur between node C and node D, and between node B and node C, node B does not simply decide to send only the packet at the head of its buffer queue when node C sends a packet. Instead, based on its knowledge of both the specific packet ($p_i$) sent by node C and the target queue length of the buffer 142 at node C, node B can identify either how many packets (and therefore, which packets) or which packets (and therefore, how many packets) it should send to node C. Repair mechanisms for dealing with packet losses are described in more detail further below.

In a manner similar to that just described, when the packet $P_{i+k}$ is sent (broadcast) from node B to node C, node A is able to overhear it and sends a packet or packets to node B in response. This process is propagated until it reaches the source 110.

A pull-based approach such as that just described is fundamentally different from conventional push-based approaches. In a pull-based approach, when a node fails to forward packets to its downstream node in succession, the occupied buffer space of the downstream node is utilized to avoid buffer underflow. In other words, an objective of a pull-based approach is to sustain a given data transfer rate and, in this sense, a pull-based approach is better suited to enforce a rate allocation scheme than a push-based approach (rate control mechanisms for a pull-based approach are described further below).

Repair Mechanisms for Dealing with Packet Loss

Repair mechanisms can be generally characterized as passive and active. In the example of FIG. 1, passive repair can be used when node D successfully receives packet $p_i$ but node B fails to detect this (e.g., for some reason, the packet broadcast by node C is not received at node B). This scenario can be generally extended to one in which this failure lasts for awhile such that node B misses all packets from $p_i$ to $p_{i+j-1}$ (j<k-1). Thus, when node B overhears the next packet $p_{i+j}$, and based on its knowledge of the length 'k' of the buffer 142 at node C, then node B can calculate that the buffer 142 currently contains only k-j-1 packets. In order to fill the buffer 142 back to the level of 'k' packets, the node B will send j+1 packets in a best-effort manner (e.g., at the highest transmission rate permitted by the hardware and by the bandwidth of the communication link).

Figure 2:
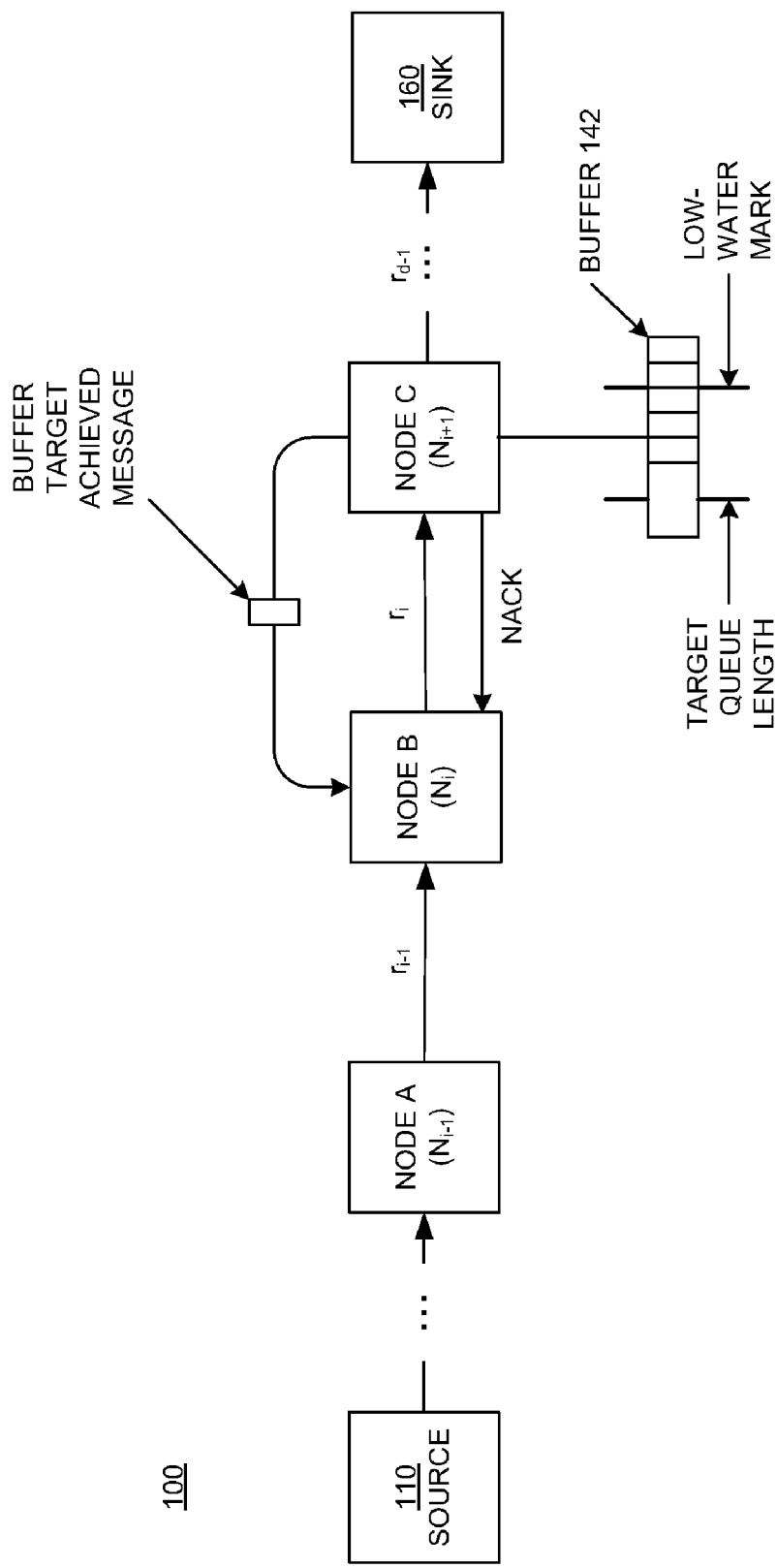

Active repair can be used when node B fails to detect packets broadcast by node C for a longer period of time, such that node C drains the buffer 142 before receiving any new packets from node B. In this case, node C sends a directed message (e.g., a NACK; FIG. 2) to node B. In one embodiment, the NACK is sent when the number of packets in the buffer 142 reaches a lower bound threshold value (a low-water mark, e.g., 20 percent of 'k'). In one embodiment, the NACK also identifies how many packets node B needs to send to node C in order to fill the buffer 142 back to the level of 'k' packets, although node B may be able to derive this number based on knowledge of the lower bound threshold value and the length of the buffer 142.

As noted above, if for some reason there is persistent breakage along the routing path, then the underlying routing protocol will perform a re-routing to build up a new routing path between the source 110 and the sink 160. In one embodiment, because of cost considerations, the packets stored at nodes that were members of the old routing path are discarded.

Data Stream Initiation

At some point in time, the source 110 is prompted to capture and transmit data (e.g., video data). For example, as mentioned above, the network 100 may be multi-tiered and event-driven, in which case a sensor (e.g., a video sensor) will begin to capture and transmit data when triggered to do so by a lower-level mote. Consequently, the sink 160 does not know beforehand when the source 110 will start to transmit data and for how long the transmission will last. Accordingly, a push-based approach is used to initiate a data stream, in order to populate the various nodes A-D with packets so that the pull-based approach can then be used. In essence, a push-based approach is used to prime (preload) the nodes on the routing path with a number of packets that depends on the number of nodes on the routing path and the buffer lengths of those nodes; once each node is primed, it transitions to a pull-based approach.

The stream initiation process is described in conjunction with FIG. 2. Initially, all of the nodes A-D are in the push mode, meaning that they each send data in a best-effort manner. In the example of FIG. 2, $r_{i-1}$ is the transmission rate associated with the link between node $N_{i-1}$ (e.g., node A) and node $N_i$ (e.g., node B), and $r_i$ is the transmission rate associated with the link between node $N_i$ and node $N_{i+1}$ (e.g., node C). Note that the transmission rates are not necessarily the maximum theoretical rate, but the actual rate possible based on the rate control mechanisms described further below. In other words, the rates $r_{i-1}$ and $r_i$ may be adjusted up or down. As will be seen, a fair rate allocation mechanism implemented at the sink 160 establishes a transmission rate for the last hop to the sink, and that transmission rate may be propagated upstream to the various hops along the routing path.

When $r_{i-1}$ is greater than $r_i$, then packets arrive at node $N_i$ faster than they leave, and therefore packets will accumulate in the buffer 142 at node $N_i$. When the number of packets in the buffer 142 reaches a predefined threshold value (a measure of fullness such as the target queue length, e.g., 80 percent of buffer capacity), then node $N_i$ sends a "buffer target achieved" message to its upstream node, $N_{i-1}$. The buffer target queue length may be the same or different for each node. The buffer target achieved message from node $N_i$ causes node $N_{i-1}$ to change from the push-based approach to a pull-based approach. In one embodiment, the buffer target achieved message is also used to communicate the length 'k' of the buffer 142 to node $N_{i-1}$.

As described above, a node that is operating in pull-based mode will not send a packet or packets to its neighboring downstream node until it detects (overhears) the downstream node sending a packet to the next neighboring downstream node. In other words, in pull-based mode, node $N_i$ will not receive a packet from node $N_{i-1}$ until node $N_i$ sends a packet to node $N_{i+1}$. Thus, as a result of the buffer target achieved message and the transition of node $N_{i-1}$ to the pull-based mode, the number of packets in the buffer 142 of node $N_i$ will not increase and thus the buffer will not overflow. Even if the initial stream injection rate (from the source 110) is greater than the capacity of the routing path, excessive packets will be moderated by the buffers along the path.

An integrated push-based to pull-based approach can be described as follows. Let $N_0, N_1, \ldots, N_d$ be a collection of nodes along the routing path from source node $N_0$ (e.g., the source 110) to sink node $N_d$ (e.g., the sink 160). Let $r_i$, i=0, ..., d-1 be the transmission rate of the link between nodes $N_i$ and $N_{i+1}$. After each round (after each transmission interval), a set of nodes $\{N_k\}$ changes their state from push-based to pull-based if the following condition is satisfied for $\{N_k\}$: $\min_{0 \leq i \leq k} r_i > r_{k+1}$. After the change in state to pull-based, $r_k$ is forced to $r_{k+1}$.

After some number of rounds, the transmission rate of all links along the routing path will be forced to the transmission rate associated with the slowest link on the routing path—that is, the minimum transmission rate along the routing path will establish the transmission rate for all of the links on the routing path. In a wireless video sensor network with a many-to-one traffic pattern, the link to the sink node $N_d$ (the sink 160) generally has the minimum transmission rate: $r_i < r_{d-1}$, for all i≠d-1. In those instances, the transmission rate of all links along the routing path will converge to $r_{d-1}$.

Transmission rates may change from round to round because of influences such as interference between adjacent links. Also, as described further below, the transmission rate $r_{d-1}$ along the last hop to the sink 160 can be changed by applying a fair rate allocation across concurrent and competing data streams.

Rate Control

According to embodiments described herein, rate control can be implemented at the source 110 and/or at the sink 160. While it is important to mitigate congestion and foster reliable transmission from the source to the sink, it is also important to ensure fairness among concurrent streams. If the sink 160 pulls packets from the various streams too ambitiously, then the throughput of a particular stream will depend in large part on how the topology of its routing path compares to the topologies of concurrent and competing streams.

In a video sensor network, for example, sensors that are far apart from one another may capture different events, while sensors that are close to each other may capture different angles of the same event. In either case, according to embodiments described herein, the decision as to which data stream is the most important is not left to the sensors. Instead, the sink 160 serves as the coordinator among the various streams. A rate control mechanism can be implemented at the sink 160 under human control. Alternatively, the approach about to be described can be implemented.

With reference to FIG. 2, rate control at the sink 160 can be realized by pulling packets from the last hop at a desired rate or interval. As described above, by increasing the pulling interval at the sink 160—that is, by reducing the rate $r_{d-1}$ over the last hop to the sink 160—the transmission rates across all of the previous links will not be more than $r_{d-1}$.

In a pull-based transmission approach, congestion is indicated by buffer underflow at the node(s) downstream of the congested node. In one embodiment, each packet carries a status bit that is set if, when the packet is transmitted by an intermediate node, the queue length at that node is less than a first limit (e.g., less than half of its target queue length). The sink 160 can read this bit in every packet that it receives. If a certain fraction (a second limit) of the packets have this bit set, then it is likely that there is congestion at some point in the network 100.

In one embodiment, the sink 160 computes three parameters for the most recent time interval: the average rate $R_{avg}$, the maximum rate $R_{max}$, and the minimum rate $R_{min}$. In one embodiment, the sink 160 also counts the number of packets in which the status bit is set, and if the count is greater than the second limit (e.g., 20 percent) of the total packets received, then the sink judges that the network 100 is congested and decreases the rate $r_{d-1}$; otherwise, the sink increases that rate. In one embodiment, the sink 160 implements the procedure listed in Table 1.

TABLE 1

Example Rate Adjustment Procedure

```
#define MIN_STEP 5
global float R
float R_max, R_avg, R_min
AdjustRate( ) {
    if(congested) {
        R = min(R-r_step/2, R_min)
        r_step = MIN_STEP
    }
    else {
        R = max(R + r_step, R_max)
        r_step *= 2
    }
}
```

In particular, if the sink 160 does not detect signs of congestion, it can increase the requested rate by a rate step. In one embodiment, the rate step starts from a relatively small value (five [5] kbps in the example above) and doubles after each round. However, if congestion is detected, then sink 160 will revert back to requested rate of the last round and reset the rate step to the initial value (e.g., 5 kbps).

There is a special case that occurs when a stream apparently is about to terminate. When this occurs, a dramatic difference will generally be observed between the minimum rate $R_{min}$, which should correspond to the terminating stream, and the average rate $R_{avg}$. If this occurs, a flag can be set to mark the terminating stream so that its rate is temporarily not included in the calculation described above. However, if it turns out the stream does not terminate, then the flag can be removed and its rate can again be considered in the aforementioned calculation. In other words, if the stream remains active for a period of time, then the rate associated with that stream is again included in the rate control calculation that is implemented at the sink 160.

Thus, a fair rate allocation mechanism can be implemented at the sink 160. Accordingly, rate allocation can be enforced through unified open-loop control at intermediate nodes and at the sink node, instead of with a centralized rate allocation mechanism enforced through closed-loop control. The status of bandwidth consumption near the sink 160 is quickly propagated upstream to the source 110, which can appropriately adjust its transmission rate by taking advantage of scalable video encoding, as about to be described.

With reference to FIG. 1, a rate adaptation mechanism can also be implemented at the source 110. Implementation of rate adaptation at the source 110 provides a number of benefits. For one thing, because the source 110 is at the head of the network 100, power and bandwidth can be saved throughout the network. For another, the source 110 has access to information that allows it to make intelligent decisions on how to best utilize available bandwidth. This latter aspect is particularly advantageous with regard to video data, because as a result of video compression techniques such as H.264, the data in one packet may be needed to decode the data in another packet, but not vice versa, and as such the data in the first packet may be more important than the data in the second packet. Recognizing this, the source 110 can decide to send the first packet and drop the second packet if forced to do so because of rate limits.

For example, an H.264 SVC (Scalable Video Coding) video stream includes a base layer and several enhancement layers. The enhancements layers include quality layers, spatial layers, and temporal layers. In general, the base layer includes the most important information and takes priority over the other layers if network bandwidth is limited. If more network bandwidth becomes available, then the source 110 can add quality layers, spatial layers and/or temporal layers to the stream to improve video quality at the sink 160. In general, a video encoding module at the source 110 can select arbitrary numbers of enhancement layers and generate video streams of different bit rates.

In one embodiment, the source 110 selects a bit rate according to the status (measure of fullness) of the packet buffer 112 at the source 110. In general, if the number of packets in the buffer 112 at the source 110 lies between a first (lower bound) threshold and a second (upper bound) threshold, then the source transmits packets at a first bit rate. If the number of packets in the buffer 112 decreases to less than the first threshold, then the source 110 transmits packets at a bit rate that is greater than the first bit rate. If the number of packets in the buffer 112 increases to more than the second threshold, then the source 110 transmits packets at a bit rate that is less than the first bit rate.

More specifically, in one embodiment, rate adaptation at the source 110 is implemented according to the following pseudo-code. In the example of Table 2, the upper bound threshold is 80 percent of buffer capacity, and the lower bound threshold is 20 percent of buffer capacity. Also, if the indicator has a value of '1,' then the source transmission rate is increased by one level; and if the indicator has a value of '−1,' then the source transmission rate is decreased by one level. That is, a number of different transmission rates can be defined in advance, and the source transmission rate toggles up or down between the predefined transmission rates according to the value of the indicator. In the following pseudo-code example, the term "qRatio" refers to the ratio of the number of packets in the buffer 112 to the buffer capacity.

TABLE 2

Example Pseudo-code for Rate Adaptation

```
#define upp_bound 0.8
#define low_bound 0.2
int AdjustRate(qRatio)
{
   if(qRatio>upp_bound) {
      upp_bound += (1-upp_bound)/2;
      return -1;
   }
   else if(qRatio<low_bound) {
      low_bound = low_bound/2;
      return 1;
   }
   else {
      if((qRatio>0.2)&&(qRatio<0.8)) {
         upp_bound = 0.8;
         low_bound = 0.2;
      }
      return 0;
   }
}
```

Considering the various features presented above, the network 100 of FIGS. 1 and 2 can operate as follows. A sensor node (e.g., a mote) detects an event that triggers, for example, video capture and subsequent data transmission. The source 110 transmits packets at a predefined transmission rate (e.g., its minimum transmission rate) utilizing a push-based approach. Initially, the intermediate nodes A-D are also operating in push-based mode.

The minimum capacity of the routing path (that is, the minimum transmission rate between nodes, limited by the rate set by the rate control mechanism implemented at the sink 160) may be greater than the transmission rate from the source 110, in which case the packets quickly traverse the routing path to the sink 160. Therefore, packets do not accumulate in the buffers at any of the intermediate nodes A-D, nor do packets accumulate in the buffer 112 at the source 110. Hence, the number of packets in the buffer is less than the first (lower bound) threshold (e.g., qRatio is less than 0.2), and so the source 110 is prompted to increase its transmission rate to the next higher rate. If the new transmission rate is still below the capacity of the routing path, then the process just described is repeated and the source 110 is prompted once again to increase its transmission rate.

At some point, the source transmission rate exceeds the capacity of the routing path, or at least exceeds the minimum bit rate along at least one of the links between two nodes on the path. Thus, at one of the nodes at least (e.g., node C), packets start to accumulate (e.g., in the buffer 142). Eventually, the number of packets in the buffer 142 exceeds the target queue length defined for that buffer, and as a result a buffer target achieved message is sent from node C to its upstream neighboring node, node B. As previously described herein, the buffer target achieved message causes node B to transition from the push-based mode to a pull-based mode.

Operation continues in a manner similar to that just described until all nodes along the routing path are operating using a pull-based approach. However, the source transmission rate is still greater than the capacity of the routing path, causing the buffer 112 at the source 110 to fill with packets. When the number of packets in the buffer 112 exceeds the second (upper bound) threshold, then the source 110 is prompted to reduce its transmission rate to the next lowest rate. Because all of the nodes A-D will maintain their buffers at their respective target queue lengths according to the pull-based approach described above, the buffer 112 will begin to drain. When the number of packets in the buffer 112 decreases to less than the first (lower bound) threshold, the source 110 is prompted to once again increase its transmission rate to the next highest level. Operation continues in this manner until all packets from the source 110 are transmitted.

Figure 3:
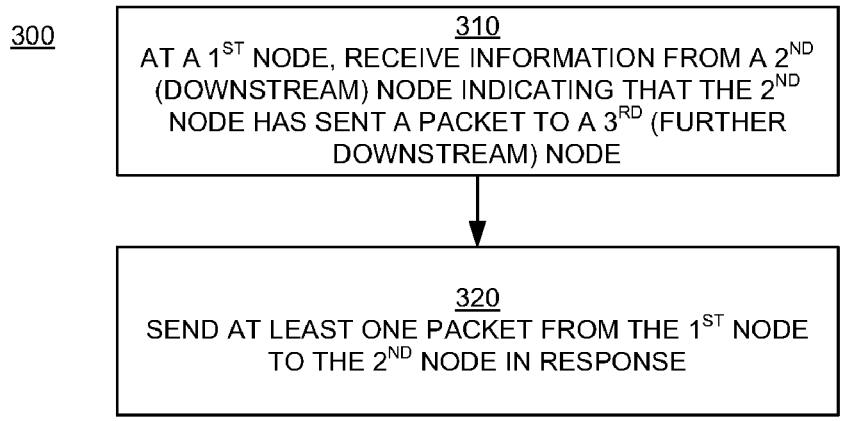
FIGS. 3, 4 and 5 are flowcharts of embodiments of methods for transmitting data in a network.
Figure 4:
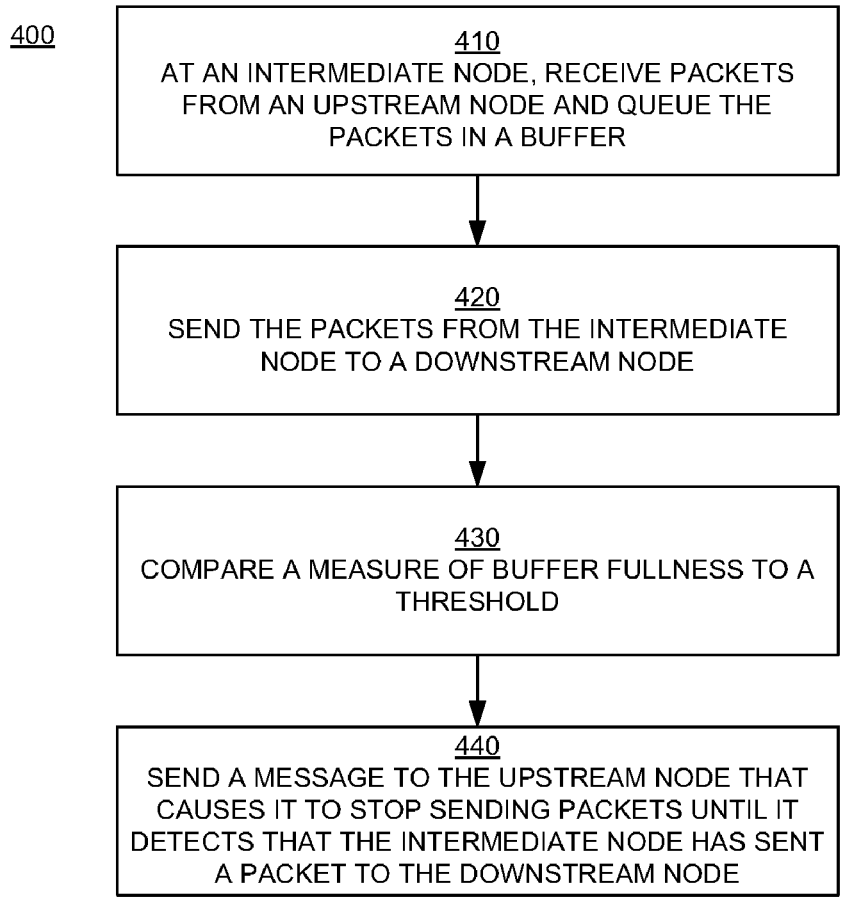
Figure 5:
Figure 5:
Figure 5:

FIGS. 3, 4 and 5 are flowcharts 300, 400 and 500, respectively, of embodiments of methods for transmitting data in a network. Although specific steps are disclosed in the flowcharts 300, 400 and 500 (300-500), such steps are exemplary. That is, various other steps or variations of the steps recited in the flowcharts 300-500 can be performed. The steps in the flowcharts 300-500 may be performed in an order different than presented. Furthermore, the features of the various embodiments described by the flowcharts 300-500 can be used alone or in combination with each other. In one embodiment, the flowcharts 300-500 can be implemented as computer-executable instructions stored in a computer-readable medium.

With reference first to FIG. 3 and also to FIGS. 1 and 2, the flowchart 300 illustrates a pull-based approach that can be implemented at one of the intermediate nodes in the network 100. In block 310, information is received at a first node (e.g., node B) from a second node (e.g., node C) that is downstream of the first node, indicating that the second node has sent a first packet (e.g., packet $p_i$) to a third node (e.g., node D) that is downstream of both the first node and the second node. Specifically, in one embodiment, the packet $p_i$ is broadcast from node C and is received at both node B and node D.

In block 320, the first node (e.g., node B) sends at least one packet (e.g., packet $p_{i+k}$) to the second node (e.g., node C) in response to the information (e.g., packet $p_i$) received at node B as just described. Similarly, the packet $p_{i+k}$ is broadcast by node B so that a fourth node (e.g., node A) that is upstream of node B also receives packet $p_{i+k}$. In response, the fourth node (e.g., node A) sends a packet to the first node (e.g., node B).

In one embodiment, the first node (e.g., node B) identifies the number of packets that are needed to fill a buffer at the second node (e.g., the buffer 142 of node C) to an upper bound threshold value (e.g., a target queue length), and then sends that number of packets to the second node.

In another embodiment, the first node (e.g., node B) receives a message (e.g., a NACK) from the second node (e.g., node C). Node C sends such a message when the number of packets in its buffer 142 falls below a lower bound threshold value (a low-water mark). In response to receiving such a message, the first node (e.g., node B) sends enough packets to the second node (e.g., node C) to fill the buffer 142 to its target queue length.

With reference now to FIG. 4 and also to FIGS. 1 and 2, the flowchart 400 illustrates the transition of a node from a push-based approach to a pull-based approach. In block 410, an intermediate node (e.g., node C) receives packets from an upstream node (e.g., node B), with the upstream node operating in the push-based mode. In one embodiment, the upstream node (e.g., node B) sends packets at a rate that corresponds to a rate (e.g., $r_{d-1}$) established by the sink 160, as previously described herein.

In block 420, the intermediate node (e.g., node C) queues the packets in a buffer (e.g., the buffer 142) before sending the packets to a downstream node (e.g., node D).

In block 430, the intermediate node (e.g., node C) compares the number of packets in its buffer to a threshold value (a target queue length).

In block 440, if the number of packets in the buffer exceeds the threshold value, then the intermediate node (e.g., node C) sends a message (e.g., a buffer target achieved message) to the upstream node (e.g., node B). In response to such a message, the upstream node (e.g., node B) transitions to a pull-based approach. More specifically, in response to such a message, the upstream node will stop sending packets to the intermediate node (e.g., node C) until it detects that the intermediate node has sent a packet to the downstream node (e.g., node D). However, the upstream node (e.g., node B) may send packets to the intermediate node (e.g., node C) if it receives a second message (e.g., a NACK) from the intermediate node.

With reference now to FIG. 5 and also to FIGS. 1 and 2, the flowchart 500 illustrates a rate adaptation mechanism that can be implemented at the source 110. In block 510, packets are queued in a buffer 112 at the source 110.

In block 520, the packets are transmitted from the source 110 at a first transmission rate.

In block 530, the source transmission rate is increased if the number of packets in the buffer 112 decreases to below a first (lower bound) threshold. In block 540, the source transmission rate is decreased if the number of packets in the buffer 112 increases to above a second (upper bound) threshold. That is, the source transmission rate is increased if, for example, the buffer 112 is filled to less than 20 percent of capacity, and decreased if the buffer is filled to more than 80 percent of capacity.

In summary, a pull-based transmission approach is used to mitigate congestion and address the funneling effect in data transmission networks such as wireless video sensor networks, especially when there are a number of concurrent events and therefore a similar number of competing data streams. Also, using a rate control mechanism at the source, the amount of information that is transmitted to the sink is increased. In addition, using a rate control mechanism at the sink, fairness in terms of received bit rates is ensured across competing streams.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for transmitting data in a network comprising a plurality of nodes that link a source node and a sink node, said method comprising:
   receiving information at a first node of said network, said information received from a second node in said network that is downstream of said first node, said information indicating that said second node has sent a first packet to a third node in said network that is downstream of both said first node and said second node;
   sending a second packet from said first node to said second node in response to receiving said information at said first node;
   setting a status bit in a packet if a measure of buffer fullness at any node in said network that transmitted said packet is less than a first limit; and
   adjusting, by said sink node, a transmission rate at which said sink node receives packets from its upstream node if a number of packets received at said sink node that have said status bit set is greater than a second limit, wherein a rate at which packets are sent from said first node to said second node is adjusted according to said transmission rate established by said sink node.

2. The method of claim 1 wherein said second node broadcasts said first packet such that said first node also receives said first packet from said second node, wherein said first packet comprises said information indicating that said second node has sent said first packet to said third node.

3. The method of claim 1 further comprising said first node broadcasting said second packet such that a fourth node that is upstream of said first node also receives said second packet, said fourth node sending a third packet to said first node in response to receiving said second packet.

4. The method of claim 1 further comprising:
   in response to receiving said information from said second node, identifying a number of packets that would be needed to fill a buffer of said second node to a threshold level; and
   sending said number of packets including said second packet from said first node to said second node.

5. The method of claim 1 further comprising:
   receiving a message at said first node, said message sent from said second node in response to the number of packets in a buffer of said second node falling below a threshold value; and
   sending a plurality of packets including said second packet from said first node to said second node, said plurality of packets comprising enough packets to fill said buffer to said threshold value.

6. The method of claim 1 further comprising said source node queuing packets in a buffer and adjusting a rate at which it sends said packets to a downstream node according to a measure of fullness of said buffer, said adjusting comprising increasing said rate from said source node to said downstream node if said measure is reduced to less than a first threshold and decreasing said rate from said source node to said downstream node if said measure is increased to more than a second threshold.

7. A method for transmitting data in a network comprising a plurality of nodes that link a source node with a sink node, said method comprising:
   receiving, at an intermediate node of said network, packets from an upstream node in said network;
   sending said packets from said intermediate node to a downstream node in said network, wherein said packets are placed in a buffer of said intermediate node subsequent to said receiving and prior to said sending;
   comparing a measure of fullness of said buffer to a first threshold;
   sending a first message from said intermediate node to said upstream node when said first threshold is exceeded, said first message causing said upstream node to stop sending packets to said intermediate node until said upstream node receives information from said intermediate node indicating that said intermediate node has sent a packet to said downstream node;
   setting a status bit in said packet if said measure of fullness is less than a second threshold; and
   adjusting, by said sink node, a transmission rate at which said sink node receives packets from its upstream node if a number of packets received at said sink node that have said status bit set is greater than a third threshold, wherein a rate at which packets are sent from said intermediate node to said downstream node is adjusted according to said transmission rate established by said sink node.

8. The method of claim 7 further comprising said intermediate node broadcasting said packet such that said upstream node also receives said packet from said intermediate node.

9. The method of claim 8 further comprising said upstream node, in response to receiving said packet from said intermediate node, identifying a number of packets that would be needed to fill a buffer of said intermediate node to a fourth threshold, said upstream node then sending, to said intermediate node, said number of packets that would be needed to fill said buffer of said intermediate node to said fourth threshold.

10. The method of claim 7 further comprising:
receiving a second message from said intermediate node to said upstream node, said second message sent when the number of packets in a buffer of said intermediate node falls below a fourth threshold; and
in response to said second message, sending a plurality of packets from said upstream node to said intermediate node, said plurality of packets comprising enough packets to fill said buffer of said intermediate node to said fourth threshold.

11. The method of claim 7 further comprising:
queuing packets in a buffer at said source node; and
adjusting a rate at which said source node sends said packets in said buffer at said source node to a node downstream of said source node according to a measure of fullness of said buffer at said source node, said adjusting comprising increasing said rate from said source node to said node downstream of said source node if said measure of fullness of said buffer at said source node is reduced to less than a fourth threshold and decreasing said rate from said source node to said node downstream of said source node if said measure of fullness of said buffer at said source node is increased to more than a fifth threshold.

12. A method for transmitting data in a network from a source node through a plurality of nodes to a sink node, said method comprising:
queuing packets in a buffer of said source node;
transmitting said packets from said source node to a first downstream node responsive to receiving information from said first downstream node that said first downstream node has sent at least one packet to a second downstream node, said packets transmitted from said source node at a first rate when the number of packets in said buffer is greater than a first threshold and less than a second threshold;
increasing said first rate to a second rate when the number of packets in said buffer is less than said first threshold;
decreasing said first rate to a third rate when the number of packets in said buffer is greater than said second threshold;
setting a status bit in a packet if a measure of buffer fullness at any node in said network that transmitted said packet is less than a first limit; and
adjusting, by said sink node, a transmission rate at which said sink node receives packets from its upstream node if a number of packets received at said sink node that have said status bit set is greater than a second limit, wherein a rate at which packets are sent from said first downstream node to said second downstream node is adjusted according to said transmission rate established by said sink node.

13. The method of claim 12 further comprising:
receiving at said source node said at least one packet that is broadcast by said first downstream node; and
sending a second packet to said first downstream node in response to receiving said at least one packet.

14. The method of claim 13 further comprising:
in response to receiving said at least one packet from said first downstream node, identifying a number of packets that would be needed to fill a buffer of said first downstream node to a third threshold; and
sending said number of packets from said source node to said first downstream node.

15. The method of claim 12 further comprising:
receiving at said source node a message from said first downstream node, said message sent when the number of packets in a buffer of said first downstream node falls below a third threshold; and
sending a plurality of packets from said source node to said first downstream node, said plurality of packets comprising enough packets to fill said buffer to said third threshold.

* * * * *